United States Patent [19]

Chang et al.

[11] Patent Number: 5,633,858
[45] Date of Patent: May 27, 1997

[54] METHOD AND APPARATUS USED IN HASHING ALGORITHM FOR REDUCING CONFLICT PROBABILITY

[75] Inventors: Chung-Ju Chang; Lain-Chyr Hwang; Ray-Guang Cheng; Ji-Hsiang Yu, all of Hsinchu, Taiwan

[73] Assignee: Accton Technology Corporation, Hsinchu, Taiwan

[21] Appl. No.: 608,704

[22] Filed: Feb. 29, 1996

Related U.S. Application Data

[63] Continuation-in-part of Ser. No. 282,031, Jul. 28, 1994, abandoned.

[51] Int. Cl.⁶ .................. H04J 3/24; G06F 13/00
[52] U.S. Cl. .............. 370/255; 370/392; 395/421.06; 395/421.11
[58] Field of Search .................. 370/13, 13.1, 17, 370/60, 60.1, 79, 85.1, 85.2, 85.3, 85.13, 94.1, 94.2, 94.3, 110.1; 371/32, 33, 37.1, 40.1, 67.1, 69.1, 71; 395/185.01, 185.02, 185.03, 185.05, 200.02, 421.06, 421.07, 421.1, 421.11, 500, 650, 800, 846, 848, 860, 863

[56] References Cited

U.S. PATENT DOCUMENTS

| | | | |
|---|---|---|---|
| 4,677,588 | 6/1987 | Benjamin et al. | 395/200.02 |
| 4,933,937 | 6/1990 | Konishi | 370/85.13 |
| 5,006,978 | 4/1991 | Neches | 395/650 |
| 5,025,491 | 6/1991 | Tsuchiya et al. | 340/825.52 |
| 5,027,350 | 6/1991 | Marshall | 370/85.13 |
| 5,032,987 | 7/1991 | Broder et al. | 395/421.11 |
| 5,088,090 | 2/1992 | Yacoby | 370/85.13 |
| 5,111,453 | 5/1992 | Morrow | 370/85.13 |
| 5,247,520 | 9/1993 | Geise et al. | 370/94.1 |
| 5,287,499 | 2/1994 | Nemes | 395/600 |

*Primary Examiner*—Alpus H. Hsu
*Attorney, Agent, or Firm*—Knobbe, Martens, Olson & Bear, LLP

[57] ABSTRACT

The present invention is related to a method adapted to be used in hashing algorithm for reducing conflict probability which comprises the steps of receiving a first physical address of a frame; generating a hashing address corresponding to the first physical address; comparing a second physical address corresponding to the hashing address with the first physical address to determine if the first and the second physical addresses match with each other; completing a packet calling process when the first and the second physical addresses match with each other, but going back to the comparing process when the first and the second physical addresses do not match with each other, to determine whether there is another second physical address corresponding to the hashing address and matching with the first physical address; and ending the packet calling process when a number of times that the comparing process is proceeded is greater than a reference value. By this method, a specific conflict probability is obtained, and according to the results, the conflict probability and the broadcasting probability are reduced and the source of the network is saved.

20 Claims, 11 Drawing Sheets

METHOD AND APPARATUS USED IN HASHING ALGORITHM FOR REDUCING CONFLICT PROBABILITY

The present invention is a CIP application of the parent application bearing the Ser. No. 08/282,031 and filed on Jul. 28, 1994, now abandoned.

FIELD OF THE INVENTION

The present invention is related to a method and an apparatus for reducing conflict probability, and especially related to a method and an apparatus adapted to be used in hashing algorithm for reducing conflict probability.

BACKGROUND OF THE INVENTION

In data exchange network, the key point that allows the data rapidly transmitted among ports is to record and learn all the net addresses effectively in order to find a destination port soon.

In a general data exchange network, the transmitted data is cut and packed, and every packet has a corresponding physical address. The data is transmitted from a node to another according to the physical addresses of the nodes. The physical addresses in different network are different in length. A 48-bit physical address is given as an example, which also occurs in Ether Network and means that there are $2^{48}$ possible addresses in the network. When a data is transmitted from a node A to a node B through path selection, it is necessary for the path selection to use a memory whose volume is $2^{48}$ bytes to judge which address is on a certain node. Therefore, an impossible huge memory is needed. Because of this, a path select table, i.e. a routing table, built according to hashing algorithm is adopted for processing the transmission among the nodes. A hashing address needed when accessing the physical address stored in the routing table is generated through a hashing function which is dependent on and obtained from the used method, e.g. an XOR or a CRC (Cyclic Redundancy Coding) method.

In general interworking unit, the way of processing the packet calling is learning or forwarding path selection, i.e. a leaning procedure or a routing procedure. The proceeding way of a learning and a routing procedures are shown respectively in FIGS. 1A and 1B. No matter which procedure is used for processing the packet calling 11 or 16, a hashing address 13 or 17 generated through a hashing function 12 is needed when accessing a physical address 15 or 18 corresponding to the hashing address 13 or 17 and being stored in the routing table 14. In the learning procedure, the port address 15 of a packed source address 11 is recorded in the routing table 14 to identify from which port the source address 11 comes. On the other hand, in the routing procedure, the port address 18 of a packed destination address 16 is requested from the routing table 14 to identify to which port the destination address 16 goes.

In conventional hashing algorithm, only one routing table is used for accessing physical addresses either in a learning procedure or in a routing procedure. Refer to FIG. 2 which is a flow chart showing a conventional routing procedure. A 48-bit physical address (b0 ... b47) is divided into 3 16-bit parts (b0 ... b15, b16 ... b31, b32 ... b47). The parts b32 ... b47 and b16 ... b31 are processed by XOR method to obtain an interim 16-bit part. The obtained 16-bit part and the part b0 ... b15 are further processed by XOR method to thus obtain a 16-bit hashing address (A0 ... A15). The system then picks n bits (n≦16) of the hashing address (A0 ... A15) to serve as a relative address for reading a 48-bit physical address in the routing table, then compares the physical address in the routing table with the destination address, and then reads and sends the port address also serving as a path select address header to a destination port to finish a packet calling process if the two physical addresses are identical. However, the two physical addresses are defined to conflict with each other if the two physical addresses are different, and a broadcasting step will be proceeded. From FIG. 2, it is found that the routing table stores therein the related data of each frame including the media access control address (MAC address) corresponding to the hashing address, a port ID identifying to which port the destination address goes, and a valid bit state. When the valid bit state is "1", the frame is defined to be effective; while the valid bit is "0", the frame is defined to be ineffective. On the other hand, in a conventional learning procedure, the source address is written into the corresponding address of the routing table and the aging is changed into zero if the physical address in the routing table is different from the source physical address. The routing table in the learning procedure stores therein the related data of each frame including the media access control address (MAC address) corresponding to the hashing address, a port ID identifying from which port the source address comes, an aging during which the source address should be stored, and a valid bit state. When the valid bit state is "1", the frame is defined to be effective; while the valid bit is "0", the frame is defined to be ineffective.

The conventional hashing algorithm has a shortcoming of high conflict probability, wherein the term "conflict" is defined as that different physical addresses through a hashing function obtain the same hashing address, and therefore correspond to the same physical address in the routing table. For example, there are two physical addresses A and B which through a hashing function obtain the same hashing address, i.e. the corresponding n bits of A and B after being hashed are identical. The conflict will be caused when destination addresses of two packets are respectively the two physical addresses. In detail, if A is stored in the routing table earlier than B in a learning procedure, B will superimpose A in the routing table when B is stored in the routing table to execute the modifying step. Moreover, at this time, the packet with the destination address A rather than B will be broadcasted in the proceeding routing procedure. Broadcasting means that the packet is sent to every port except the source port itself, and thus the throughput of the network will be lowered.

The relevant prior art of hashing algorithm is U.S. Pat. No. 5,027,350 entitled "Method And Apparatus For Providing A Local Area Network Bridge" issued to Marshall.

Marshall discloses a method and apparatus for routing data packets utilizing hashing algorithm by comparing the source and destination addresses. As is known, applying a hash algorithm can produce an event termed "a collision" wherein items hash to the same location in the table (col. 1, lines 43–46). Marshall discloses a method to reduce collision by using a plurality of hashing (Col. 4, lines 7–11). In Marshall's method, a plurality of independent hashing algorithms must be used for each of the Marshall's routing table and the volumes of the table must be the same (col. 1, lines 46–52; col. 4, lines 7–16; col. 6, lines 10–52).

However, different from the patent to Marshall, the present invention discloses a way for memory allocation to reduce the collision. The idea of the present invention comes from the concept of the back-up system. Here, a back-up routing tables (i.e. routing tables used in a bridge except for the primary routing table) is employed to store the items that hash to the same location in the primary table. As a result, it only use a hashing algorithm to find the respective location of the routing table for each incoming address. Moreover, it can use smaller volumes for back-up routing tables because the collision of items is expected to be rarely occurred in a LAN. Thus, the method for memory allocation, proposed in the present invention, can efficiently utilize memory as well as reduce the collision probability.

Therefore, it would like to emphasize that the present invention is superior to and different from Marshall's method in many ways.

i) The present invention only utilizes one hashing for a plurality of routing tables while Marshall's method must use an independent hashing algorithm for each of the routing table. Nevertheless, it is not easy to find a plurality of independent hashing algorithms.

ii) The resulting collision probability according to the present invention will be less than Marshall's method in most situations.

SUMMARY OF THE INVENTION

An object of the present invention is to offer a method and an apparatus used in hashing algorithm for reducing conflict probability.

Another object of the present invention is to offer a method and an apparatus used in hashing algorithm for reducing broadcasting probability.

In accordance with the present invention, a method adapted to be used in hashing algorithm for reducing conflict probability, comprising the steps of: receiving a first physical address of a frame; generating a hashing address corresponding to said first physical address; comparing a second physical address corresponding to said hashing address with said first physical address to determine if said first and said second physical addresses match with each other; completing a packet calling process when said first and said second physical addresses match with each other, but going back to said comparing process when said first and said second physical addresses do not match with each other, to determine whether there is another second physical address corresponding to said hashing address and matching with said first physical address; ending said packet calling process when a number of times that said comparing process is proceeded is greater than a reference value; and the resulting conflict probability is less than a designated value, which is substantially equal to $$\frac{1}{2^n} \times \frac{2^{m-n}}{2^m} \times \frac{2^{m-n}-1}{2^m} \times \ldots \times \frac{2^{m-n}-(N-1)}{2^m},$$

wherein m is the length of said first physical address;

n is the length of said hashing address;

$2^m$ is the total number of said second physical addresses;

$2^n$ is the number of hashing addresses to be held in a routing table; and therefore $1/2^n$ is the probability that a specific address in the routing table is selected;

$2^{m-n}$ is the number of physical addresses that hash to the same address in the routing table; and therefore $$\frac{2^{m-n}}{2^m}$$

is the probability that an address hashes to a selected address in the routing table;

N is the total number of routing tables; and

N-1 is number of a back-up routing table.

In accordance with another aspect of the present invention, a definition that said second physical address and said first physical address match with each other is that said second physical address and said first physical address are identical.

In accordance with another aspect of the present invention, said packet calling process is a learning procedure.

In accordance with another aspect of the present invention, said completing said packet calling process is to complete a learning procedure which records a source address in a routing table to identify from which port said source address comes.

In accordance with another aspect of the present invention, said ending packet calling process is to execute a modifying step which substitutes a physical address for another physical address in a routing table.

In accordance with another aspect of the present invention, said first physical address is a source address of said frame.

In accordance with another aspect of the present invention, said packet calling process is a routing procedure which requests a destination address from a routing table to identify to which port said source address goes.

In accordance with another aspect of the present invention, said completing said packet calling process is to complete a routing procedure.

In accordance with another aspect of the present invention, ending said packet calling process is to execute a broadcasting step which sends a packet to every port except the source port itself.

In accordance with another aspect of the present invention, said first physical address is a destination address of said frame.

In accordance with the present invention, a method adapted to be used with hashing algorithm for reducing conflict probability, comprising the steps of: receiving a first physical address of a frame; generating a hashing address corresponding to said first physical address; comparing a second physical address corresponding to said hashing address with said first physical address to determine if said first and said second physical addresses match with each other; completing a packet calling process when said second physical address and said first physical address match with each other, but going back to said generating and comparing processes when said second physical address and said first physical address do not match with each other, to determine whether there is another second physical address corresponding to said hashing address and matching with said first physical address; ending said packet calling process when a number of times that said generating and comparing processes are proceeded is greater than a reference value; and the resulting conflict probability is less than a designated value, which is substantially equal to $$\frac{1}{2^n} \times \frac{2^{m-n}}{2^m} \times \frac{2^{m-n}-1}{2^m} \times \ldots \times \frac{2^{m-n}-(N-1)}{2^m},$$

herein m is the length of said first physical address;

n is the length of said hashing address;

$2^m$ is the total number of said second physical addresses;

$2^n$ is the number of hashing addresses to be held in a routing table; and therefore $1/2^n$ is the probability that a specific address in the routing table is selected;

$2^{m-n}$ is the number of physical addresses that hash to the same address in the routing table; and therefore $$\frac{2^{m-n}}{2^m}$$

is the probability that an address hashes to a selected address in the routing table;

N is the total number of routing tables; and

N-1 is number of a back-up routing table.

In accordance with another aspect of the present invention, said second physical address is stored in a routing table and said reference value is equal to a number of routing tables.

In accordance with another aspect of the present invention, said number of said routing tables is at least two, and the volumes of said at least two routing tables are the same.

In accordance with another aspect of the present invention, said number of said routing tables is at least two, the volumes of said at least two routing tables are different, and a number of bits of said hashing address matches with a volume of the routing table having the largest volume.

In accordance with another aspect of the present invention, said hashing address is generated by an XOR method.

In accordance with another aspect of the present invention, said hashing address is generated by a cyclic redundancy coating (CRC) method.

In accordance with another aspect of the present invention, further comprising a step of determining whether said frame is effective after receiving said first physical address of said frame, and executing said comparing step when said frame is effective, but ending said packet calling process when said frame is ineffective.

In accordance with another aspect of the present invention, further comprising a step of comparing agings of all of the second physical addresses which have been compared with said first physical address when there is no second physical address matching with said first physical address.

In accordance with another aspect of the present invention, said ending packet calling process is to execute said modifying step by substituting said first physical address for the second physical address with the largest aging.

In accordance with the present invention, a method adapted to be used in a hashing algorithm for reducing conflict probability, comprising the steps of: receiving a first physical address of a frame; generating a single hashing address corresponding to said first physical address; comparing at least two second physical addresses corresponding to said hashing address with said first physical address simultaneously to determine if said first and any of said second physical addresses match with each other; completing a packet calling process when said first and one of said second physical addresses match with each other; ending said packet calling process when there is non of said second physical addresses matching with said first physical address; and the resulting conflict probability is less than a designated values, which is substantially equal to $$\frac{1}{2^n} \times \frac{2^{m-n}}{2^m} \times \frac{2^{m-n}-1}{2^m} \times \ldots \times \frac{2^{m-n}-(N-1)}{2^m},$$

wherein m is the length of said first physical address;

n is the length of said hashing address;

$2^m$ is the total number of said second physical addresses;

$2^n$ is the number of hashing addresses to be held in a routing table; and therefore $1/2^n$ is the probability that a specific address in the routing table is selected;

$2^{m-n}$ is the number of physical addresses that hash to the same address in the routing table; and therefore $$\frac{2^{m-n}}{2^m}$$

is the probability that an address hashes to a selected address in the routing table;

N is the total number of routing tables; and

N-1 is number of a back-up routing table.

Therefore, for a given location in the routing table, the conflict probabilities of Marshall and the present invention are respectively as follows.

$$\text{Marshall's method is: } \frac{1}{2^n} \times \left(\frac{2^{m-n}}{2^m}\right)^N$$

However, the present invention is:

$$\frac{1}{2^n} \times \frac{2^{m-n}}{2^m} \times \frac{2^{m-n}-1}{2^m} \times \ldots \times \frac{2^{m-n}-(N-1)}{2^m}.$$

Accordingly, how and why the present invention is superior to or different from Marshall is proved.

The present invention may be best understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
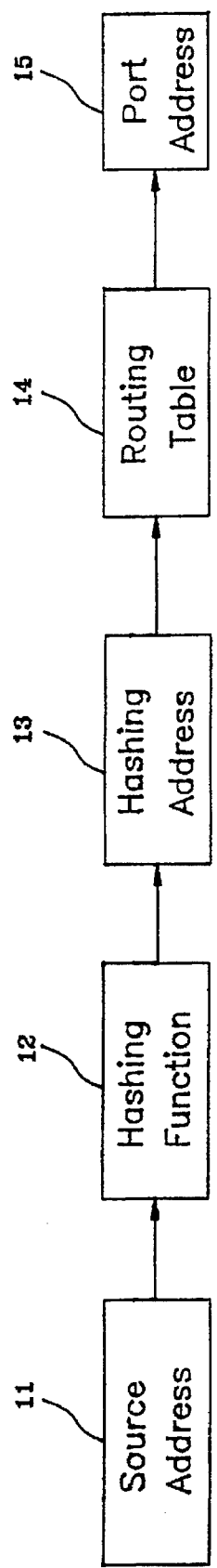
FIG. 1A is a block diagram showing a learning procedure of an interworking unit.
Figure 1B:
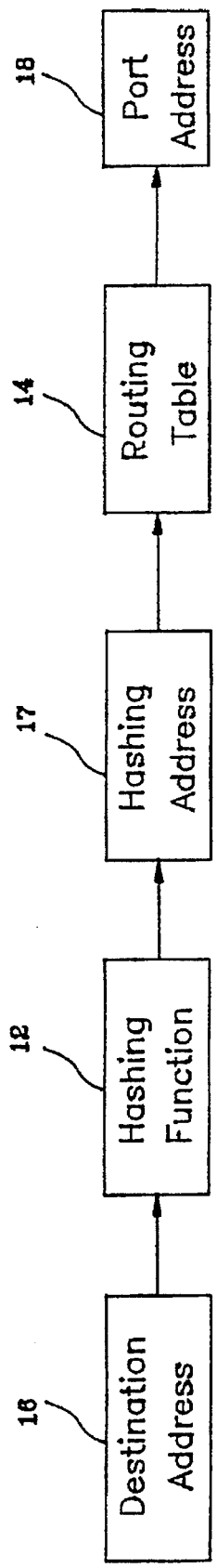
FIG. 1B is a block diagram showing a routing procedure of an interworking unit.
Figure 2:
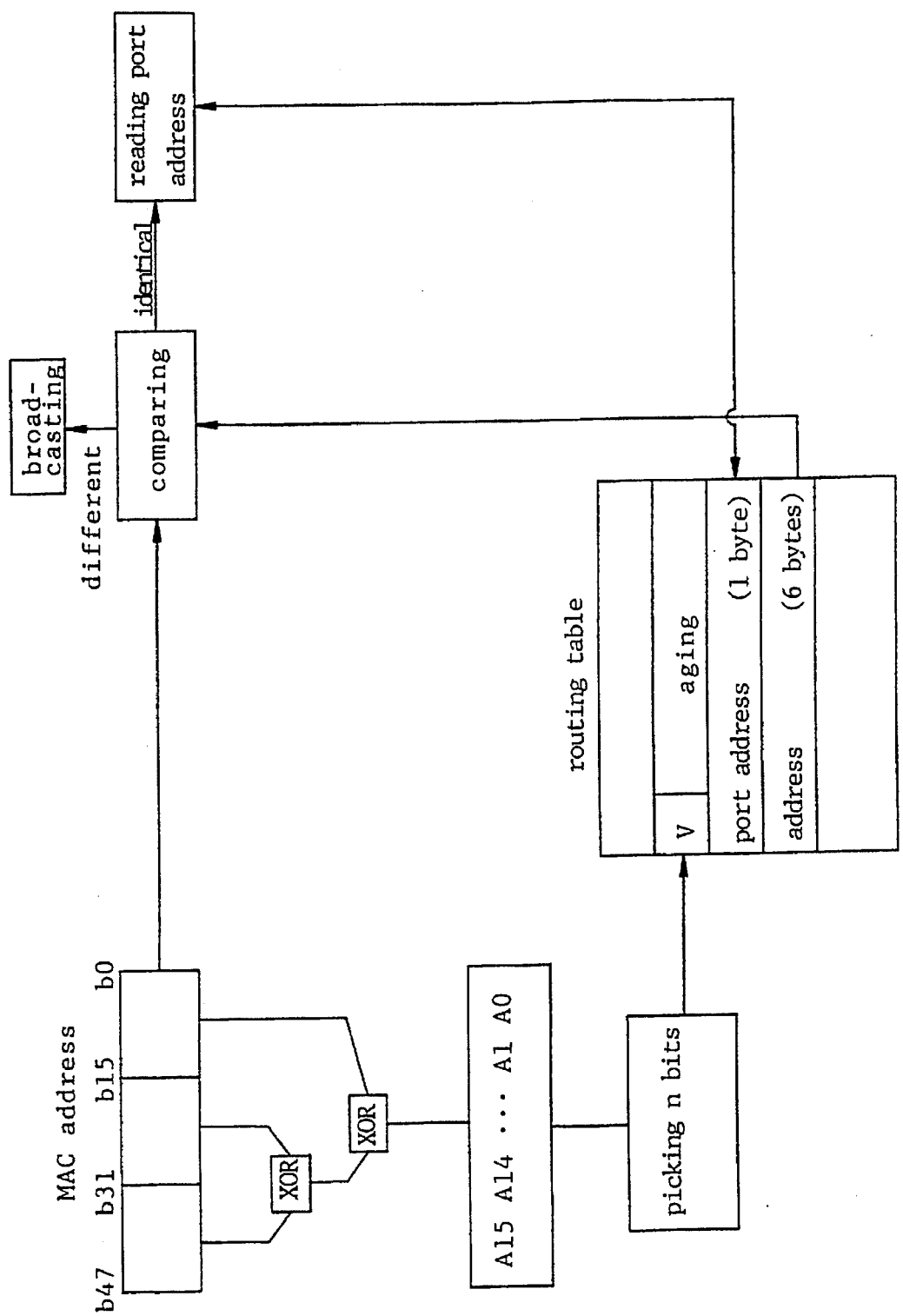
FIG. 2 is a flow chart showing a conventional routing procedure.
Figure 3:
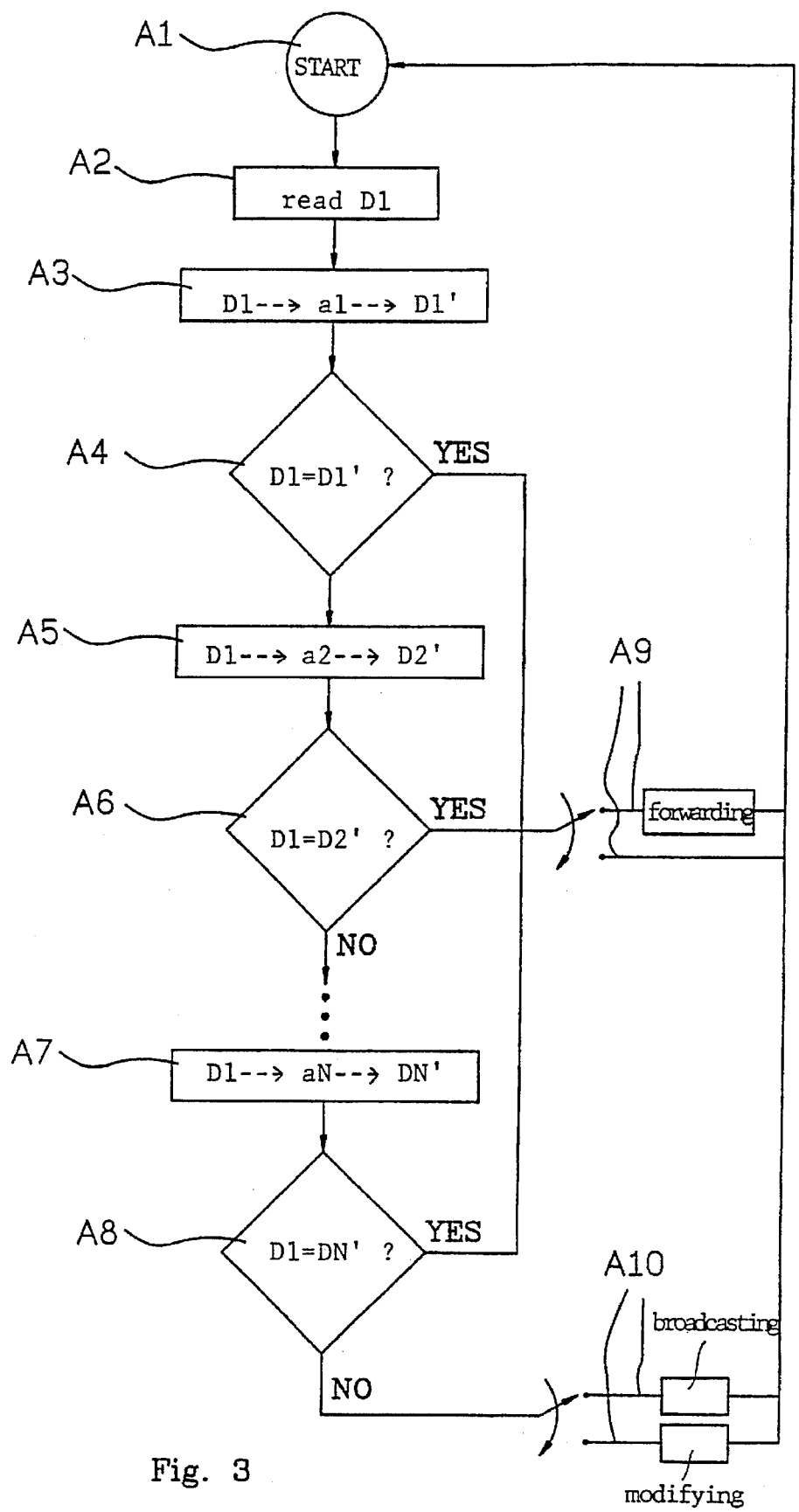
FIG. 3 is a flowchart diagram showing one of the processing ways according to the present invention.

Now refer to FIG. 3 which is a flowchart diagram showing one of the processing ways according to the present invention comprising the following steps of:

A1: starting off;

A2: reading a first physical address D1;

A3: generating a first hashing address a1 corresponding to the first physical address D1;

A4: comparing a second physical address $D_1'$ corresponding to the first hashing address a1 with the first physical address D1 and determining whether D1 and $D_1'$ are identical;

A5: generating a second hashing address a2 corresponding to the first physical address D1;

A6: comparing a second physical address $D_2'$ corresponding to the second hashing address a2 with the first physical address D1 and determining whether D1 and $D_2'$ are identical;

.
.
.

A7: generating an Nth hashing address aN corresponding to the first physical address D1;

A8: comparing another second physical address $D_N'$ corresponding to the Nth hashing address aN with the first physical address D1 and determining whether D1 and $D_N'$ are identical;

A9: finishing the packet calling process of the network, i.e. finishing a learning procedure or a routing procedure when the first and the second physical addresses are identical; and A10: ending the packet calling process of the network, i.e. executing a modifying step in the learning procedure or a broadcasting step in the routing procedure when the first and the second physical addresses are different.

The flowchart shown in FIG. 3 will be described in detail below. An inputted physical address, D1, through a hashing function, f1, generates a hashing address, a1. The number of bits of a1 must match with the volume of the routing table. For example, if the routing table allows $2^{15}$ physical addresses to be stored therein, the hashing address must be 15 bits. A second physical address $D_1'$ corresponding to the first hashing address a1 is compared with the first physical address D1 to determine whether D1 and $D_1'$ are identical. If they are identical, next physical address can be inputted in a learning procedure or the forward path selection can be proceeded in a routing procedure. On the contrary, if they are different, a second hashing address a2 generated through a second function f2 is needed to obtain another second physical address $D_2'$. In the same manner, the number of bits of the hashing address a2 must match with the volume of the routing table. The second physical address $D_2'$ corresponding to the second hashing address a2 is compared with the first physical address D1 to determine whether D1 and $D_2'$ are identical. If they are identical, next physical address can be inputted in a learning procedure or the forward path selection can be proceeded in a routing procedure. On the contrary, if they are different, a third hashing address a3 generated through a third hashing function f3 is needed to obtain another second physical address $D_3'$. Likewise, the second physical address $D_3'$ corresponding to the third hashing address a3 is compared with the first physical address D1 to determine whether D1 and $D_3'$ are identical. And so forth, when the first and the second physical address are not identical, another hashing address keeps being generated, another second physical address corresponding to the hashing address keeps being obtained, and the comparing process keeps being proceeded until the first and the second physical addresses are identical. However, when the number of times for comparing accumulates to a reference value, N, the procedure ends, i.e. there is no longer an (N+1)th hashing address or another second physical address generated even if the second physical address $D_N'$ is different from the first physical address D1. In stead, a modifying step in the learning procedure or a broadcasting step in the routing procedure is executed. The modifying step is executed by the way of substituting the first physical address for one of the second addresses in the routing table, which has the same hashing address as the first physical address and the largest aging. The reference value, N, i.e. the number of the routing tables, and the numbers of bits of the hashing addresses respectively corresponding to the routing tables are decided by the previously set conflict probability required by the system.

Of course, the N hashing addresses a1 . . . aN may be generated by the same or different methods, e.g. some of the hashing addresses are generated by a CRC method, some are generated by an XOR method, and the others directly use the last several bits of the physical address. Besides, another processing way according to the present invention and generating only one hashing address is available. If all the N routing tables have the same volume, only one hashing function is needed to generate a hashing address which can be used for obtaining N second physical addresses respectively in the N routing tables. However, if the volumes of all the N routing tables are not equal, the procedure also can use only one hashing function. The hashing address corresponding to the routing table(s) having the largest volume is used for obtaining N second physical addresses respectively in the N routing tables. When it is used for obtaining the second physical addresses respectively in the other smaller routing tables, at least one bit of the hashing address should be omitted according to the volume of the routing tables. By this way, the proceeding time may be decreased.

Furthermore, a parallelly processing way different from the aforementioned sequential processing way may also be used for saving proceeding time. The basic idea is that N hashing addresses are generated through N hashing functions executed by N logic circuits at the same time and the N second physical addresses, respectively in the N routing tables, corresponding to the N hashing addresses are compared with the first physical address simultaneously to determine whether the first and the second physical addresses are identical. If none of these second physical addresses is the same as the first physical address, a modifying step in the learning procedure or a broadcasting step in the routing procedure is executed. Otherwise, next physical address can be inputted in the learning procedure or the forward path selection can be proceeded in the routing procedure. Of course, if the volumes of all the N routing tables are equal, only one logic circuit is required. Even if the volumes of all the N routing tables are not equal, the procedure also can use only one hashing function according to the aforementioned method in the sequential processing way.

The designing theory of the present invention is described below. When designing a product, we want to know the probability that the product performs well, i.e. the reliability of the product. According to the theory about reliability, the reliability can be enhanced by using several identical subsystems to execute single function, i.e. redundancy rule. A parallel redundancy system with N subsystems, the original probability, $P_{sub}$ (for each subsystem) will be increased to system probability $P_{sys}$.

$$P_{sys}=1-(1-P_{sub})^N=1-Q^N_{sub}$$

thus $$Q_{sys}=Q^N_{sub} \quad (1)$$

wherein $P_{sub}$ is the reliability of each subsystem;

$P_{sys}$ is the reliability of the parallel redundancy system;

$Q_{sub}$, i.e. $(1-P_{sub})$, is the unreliability of each subsystem; and $Q_{sys}$ is the unreliability of the parallel redundancy system.

Figure 4B:
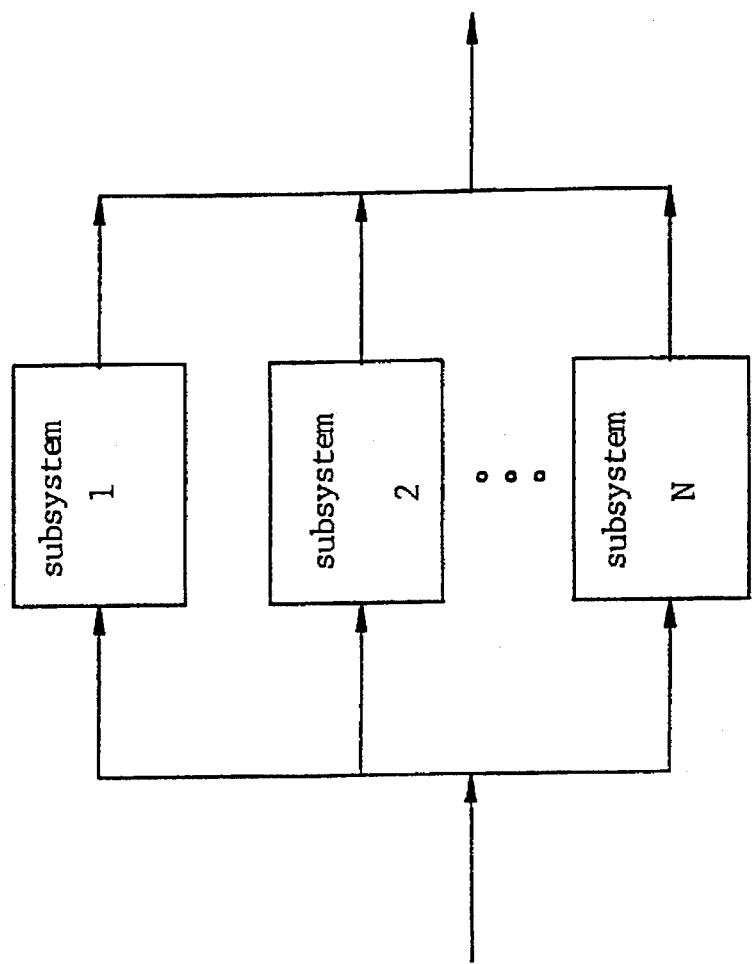
FIG. 4B is a block diagram showing a parallel redundancy system.
Figure 4A:
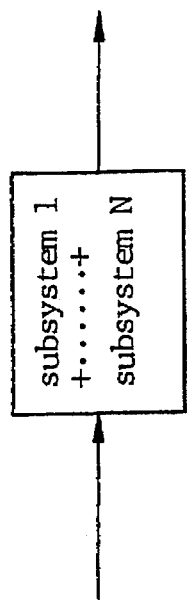
FIG. 4A is a block diagram showing an integral system.

For example, as shown in FIGS. 4A & 4B, through a k-bit hashing function, a physical address A corresponds to a hashing address f(A), so we define the conflict probability $P_c$ as the probability to find that in the other (N−1) physical addresses excluding the physical address A, there is another physical address corresponding to the hashing address f(A), and $$P_c=(N-1)p$$

wherein

N is the number of the physical addresses; and p is the probability that the other (N−1) physical addresses except A correspond to the hashing address f(A), and $$p=(2^{48-k}-1)/2^{48}$$

When k is small enough, e.g. k≦16, then $$p=\tfrac{1}{2^k}$$

thus $$P_c=(N-1)(\tfrac{1}{2^k})$$

When the volume of a memory is doubled, two kinds of systems having the equal total volume are discussed:

An integral system, as shown in FIG. 4A, which has an integral memory with twice volume, and wherein the hashing address is (k+1) bits and thus the conflict probability is $P_c/2$; and A parallel redundancy system, as shown in FIG. 4B, wherein N is equal to 2, whose memory is divided into two memories with smaller volumes, and wherein the conflict probability equals to $P_c^2$ according to the equation (1). This is an estimated value because the equation (1) is acquired by considering each memory of the parallel redundancy system is independent. However, in the present case, the two routing tables are not exactly independent.

The present invention is related to a parallel redundancy system with multiple routing tables. Several preferred embodiments having two routing tables of equal volume are now given for examples. Of course, only one hashing function is needed because the volume of the two routing tables are equal.

Figure 5A:
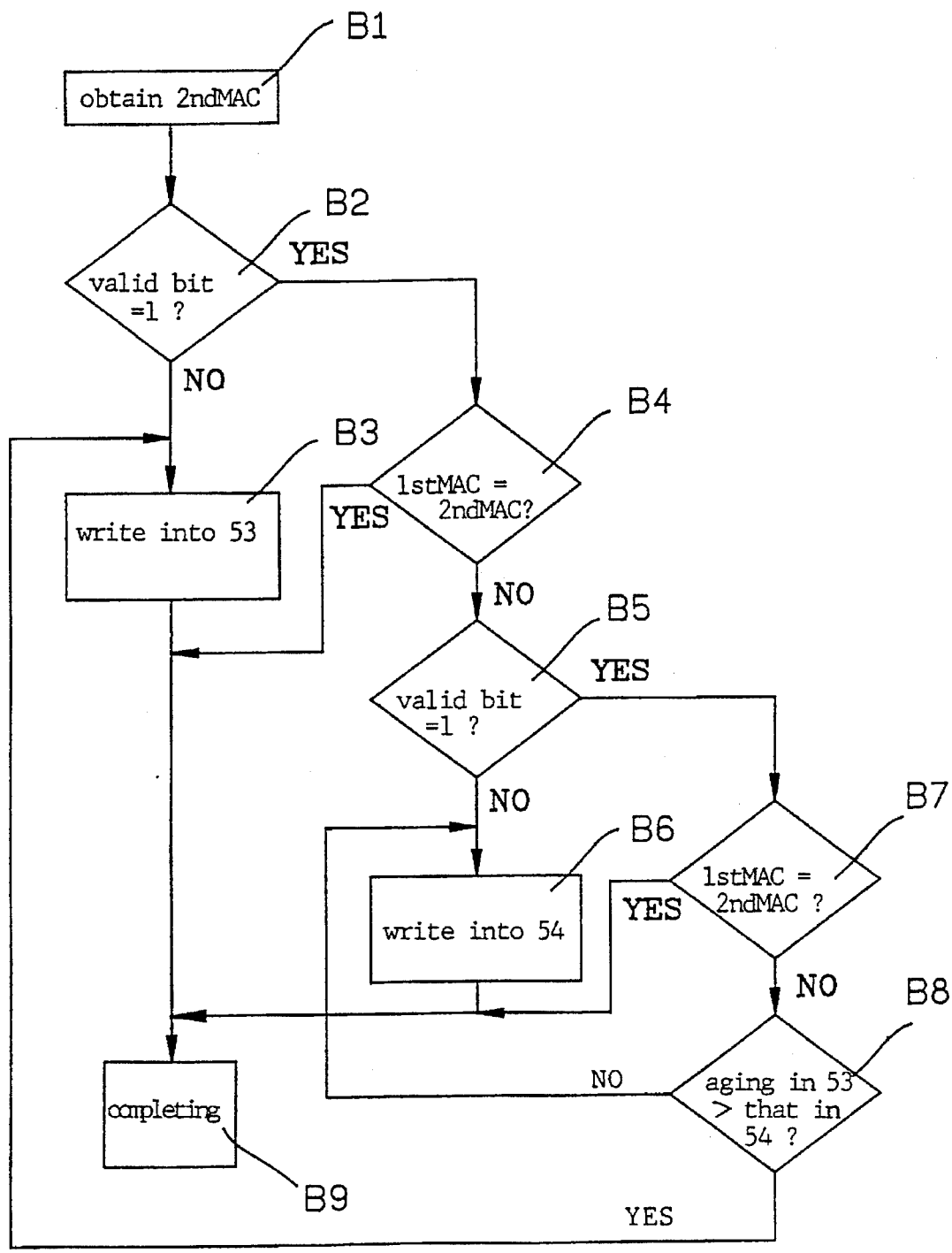
FIG. 5A is a flowchart diagram showing a preferred embodiment of a learning procedure according to the present invention.
Figure 5B:
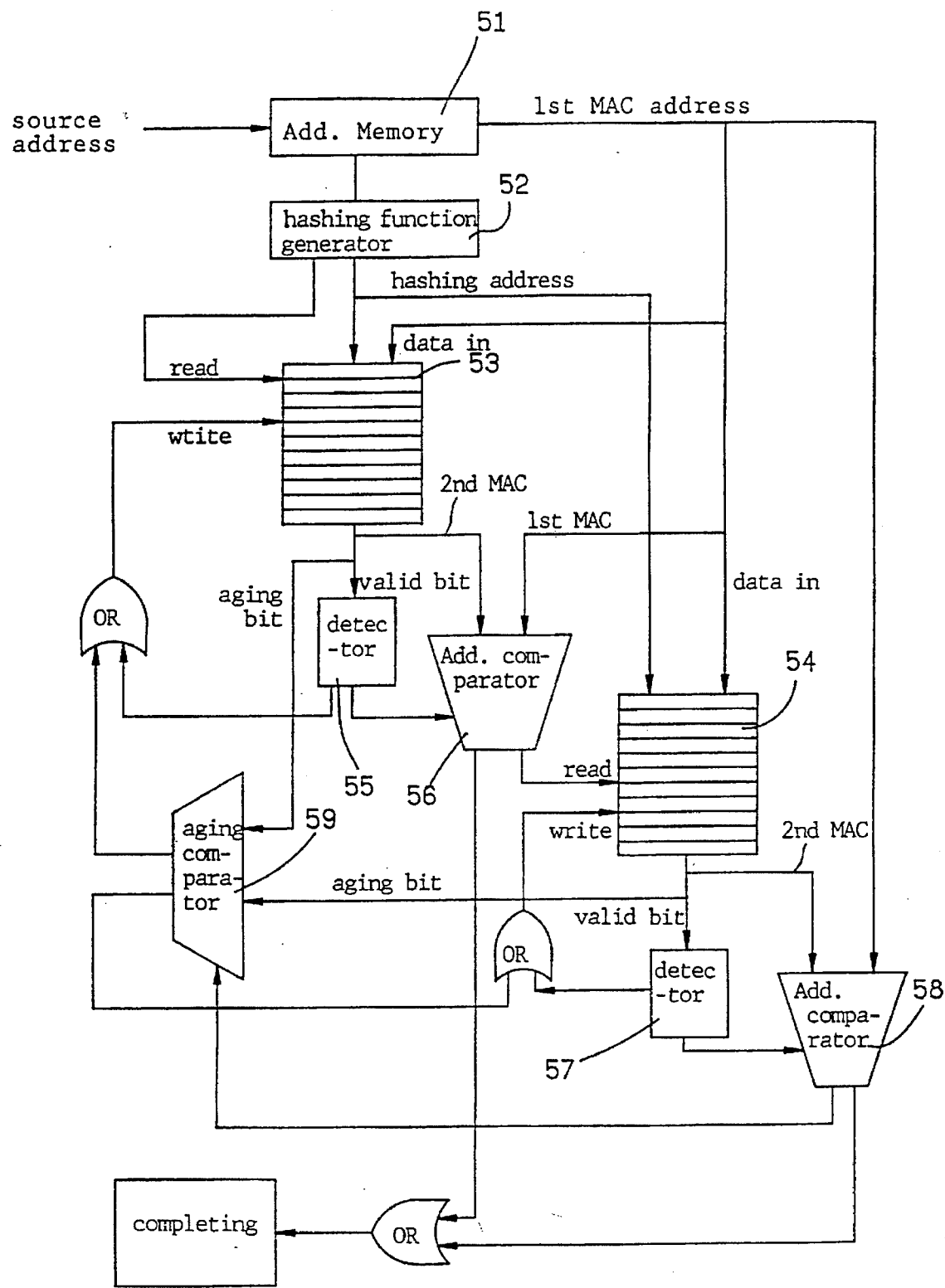
FIG. 5B is a schematic diagram showing a preferred embodiment of a learning procedure processed by a sequential way according to the present invention.

Refer now to FIGS. 5A & 5B. FIG. 5A is a flowchart diagram showing a preferred embodiment of a learning procedure according to the present invention and FIG. 5B is a schematic diagram showing a preferred embodiment of a learning procedure processed by a sequential way according to the present invention. The blocks as shown in FIG. 5B represent respectively an address memory 51 for media access control, MAC, a hashing function generator 52, two routing tables 53 and 54 which are memories, two detectors 55 and 57, two address comparators 56 and 58, and an aging comparator 59. FIG. 5A comprises the following steps of:

B1: receiving a source address of a frame and storing the source address in the address memory 51 to obtain a first MAC address corresponding to the source address, and using the hashing function generator 52 to generate a hashing address corresponding to the first MAC address;

B2: using the detector 55 to detect if the frame is effective, i.e. if the valid bit state in the routing table 53 is "1", and going to B4 if it is effective, but going to B3 if it is ineffective;

B3: writing the frame into the routing table 53;

B4: using the address comparator 56 to compare the first MAC address with a second MAC address corresponding to the first MAC address and being stored in the routing table 53 to determine whether the two MAC addresses are identical, and going to B9 if they are identical, but going to B5 if they are different;

B5: using the detector 56 to detect if the frame is effective, i.e. if the valid bit state in the routing table 54 is "1", and going to B7 if it is effective, but going to B6 if it is ineffective;

B6: writing the frame into the routing table 54;

B7: using the address comparator 58 to compare the first MAC address with another second MAC address corresponding to the first MAC address and being stored in the routing table 54 to determine whether the two MAC addresses are identical, and going to B9 if they are identical, but going to B8 if they are different;

B8: using the aging comparator 59 to compare the agings of the physical addresses in the routing tables 53 and 54, and going to B3 if the aging of the physical address in the routing table 53 is greater than that in the routing table 54, but going to B6 if the aging of the physical address in the routing table 54 is greater than that in the routing table 53; and B9: finishing the learning procedure.

Figure 5C:
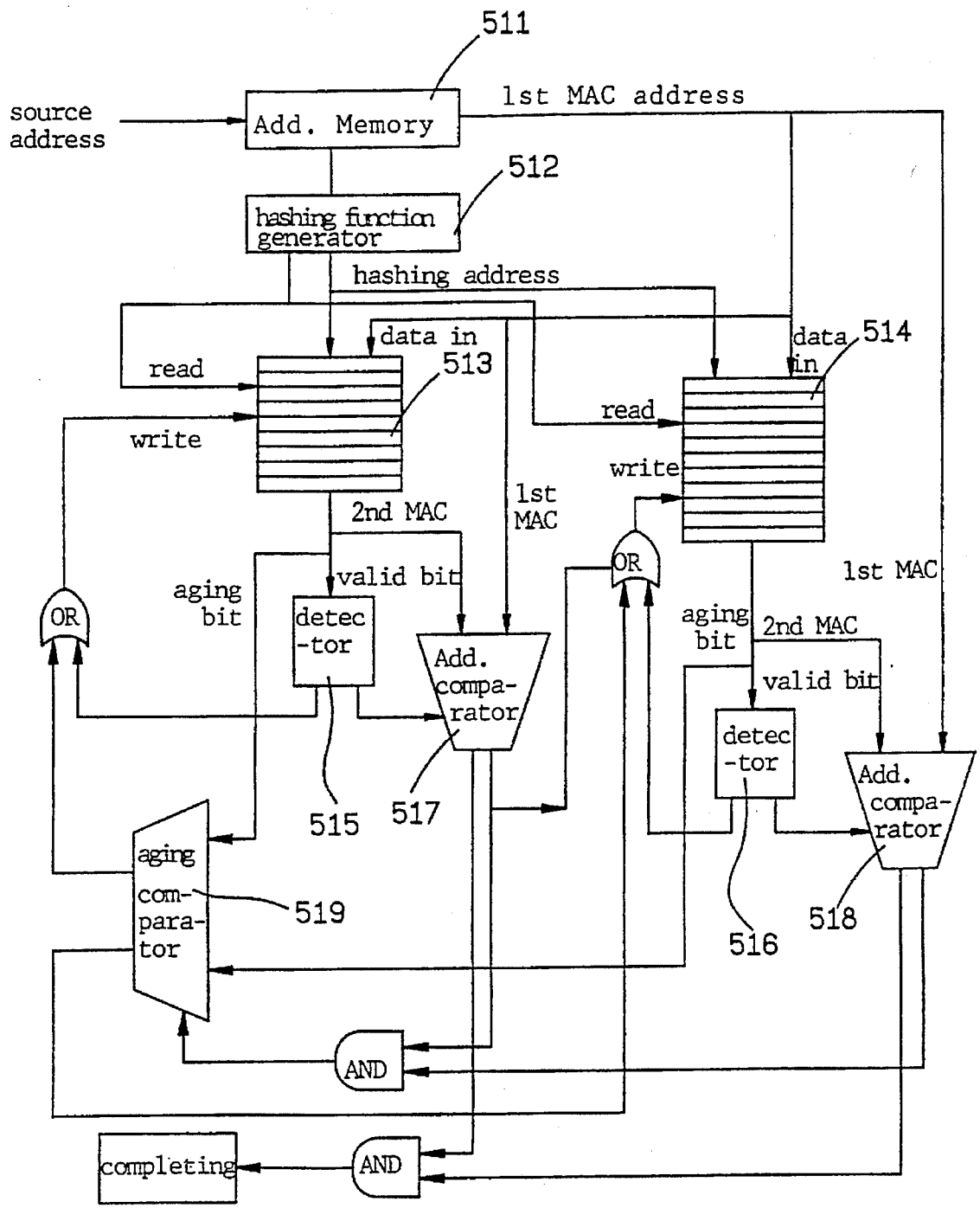
FIG. 5C is a schematic diagram showing a preferred embodiment of a learning procedure processed by a parallel way according to the present invention.

Referring now to FIG. 5C which is a schematic diagram showing a preferred embodiment of a learning procedure processed by a parallel way according to the present invention, the blocks shown therein represent respectively an address memory 511 for media access control, MAC, a hashing address generator 512, two routing tables 513 and 514 which are memories, two detectors 515 and 516, two address comparators 517 and 518, and an aging comparator 519. The functions of the devices represented by the blocks in FIG. 5C are the same as those in FIG. 5B. FIG. 5C differs from FIG. 5B only in that it compares all the second MAC addresses corresponding to the first MAC address and being stored respectively in the routing tables with the first MAC address at the same time other than in a sequential way.

Figure 6A:
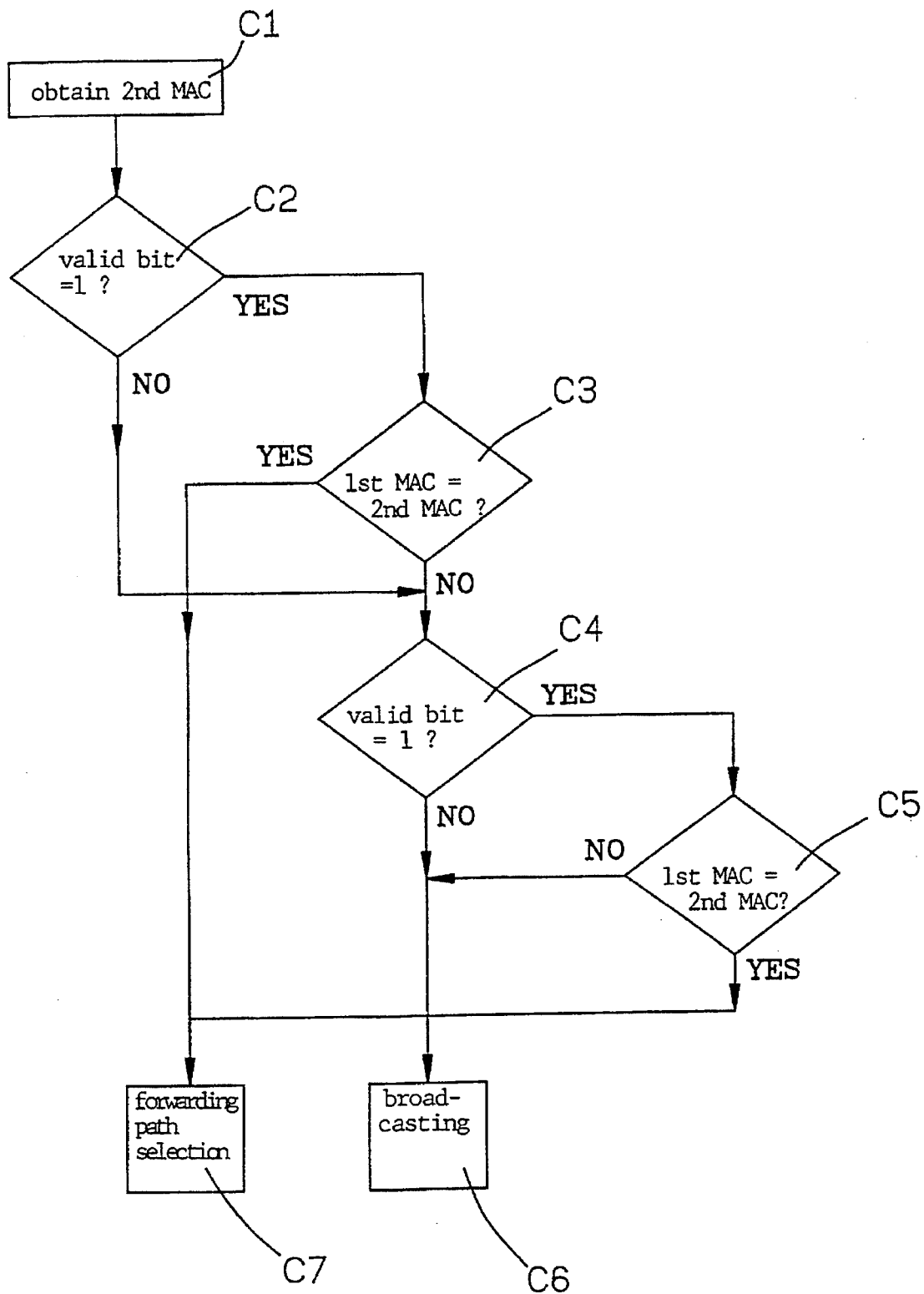
FIG. 6A is a flowchart diagram showing a preferred embodiment of a routing procedure according to the present invention.
Figure 6B:
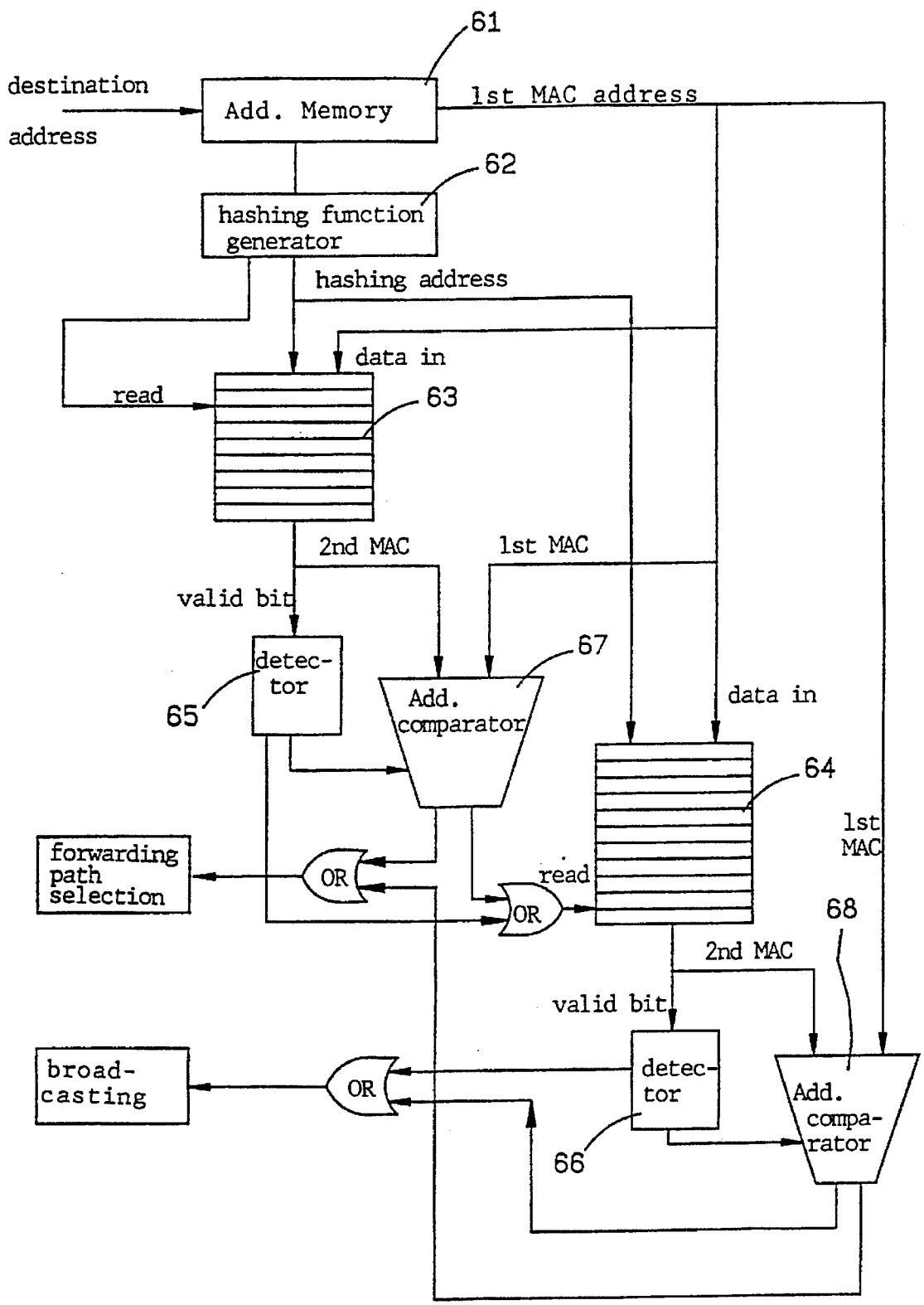
FIG. 6B is a schematic diagram showing a preferred embodiment of a routing procedure processed by a sequential way according to the present invention.

Refer now to FIGS. 6A & 6B. FIG. 6A is a flowchart diagram showing a preferred embodiment of a routing procedure according to the present invention and FIG. 6B is a schematic diagram showing a preferred embodiment of a routing procedure processed by a sequential way according to the present invention. The blocks as shown in FIG. 6B represent respectively an address memory 61 for media access control, MAC, a hashing address generator 62, two routing tables 63 and 64 which are memories, two detectors 65 and 66, two address comparators 67 and 68, and an aging comparator 69. FIG. 6A comprises the following steps of:

C1: receiving a destination address of a frame and storing the destination address in the address memory 61 to obtain a first MAC address corresponding to the destination address, and using the hashing function generator 62 to generate a hashing address corresponding to the first MAC address;

C2: using the detector 65 to detect if the frame is effective, i.e. if the valid bit state in the routing table 63 is "1", and going to C3 if it is effective, but going to C4 if it is ineffective;

C3: using the address comparator 67 to compare the first MAC address with a second MAC address corresponding to the first MAC address and being stored in the routing table 63 to determine whether the two MAC addresses are identical, and going to C7 if they are identical, but going to C4 if they are different;

C4: using the detector 66 to detect if the frame is effective, i.e. if the valid bit state in the routing table 64 is "1", and going to C5 if it is effective, but going to C6 if it is ineffective;

C6: ending the routing procedure and proceeding broadcasting; and

C7: finishing the routing procedure and proceeding forwarding path selection.

Figure 6C:
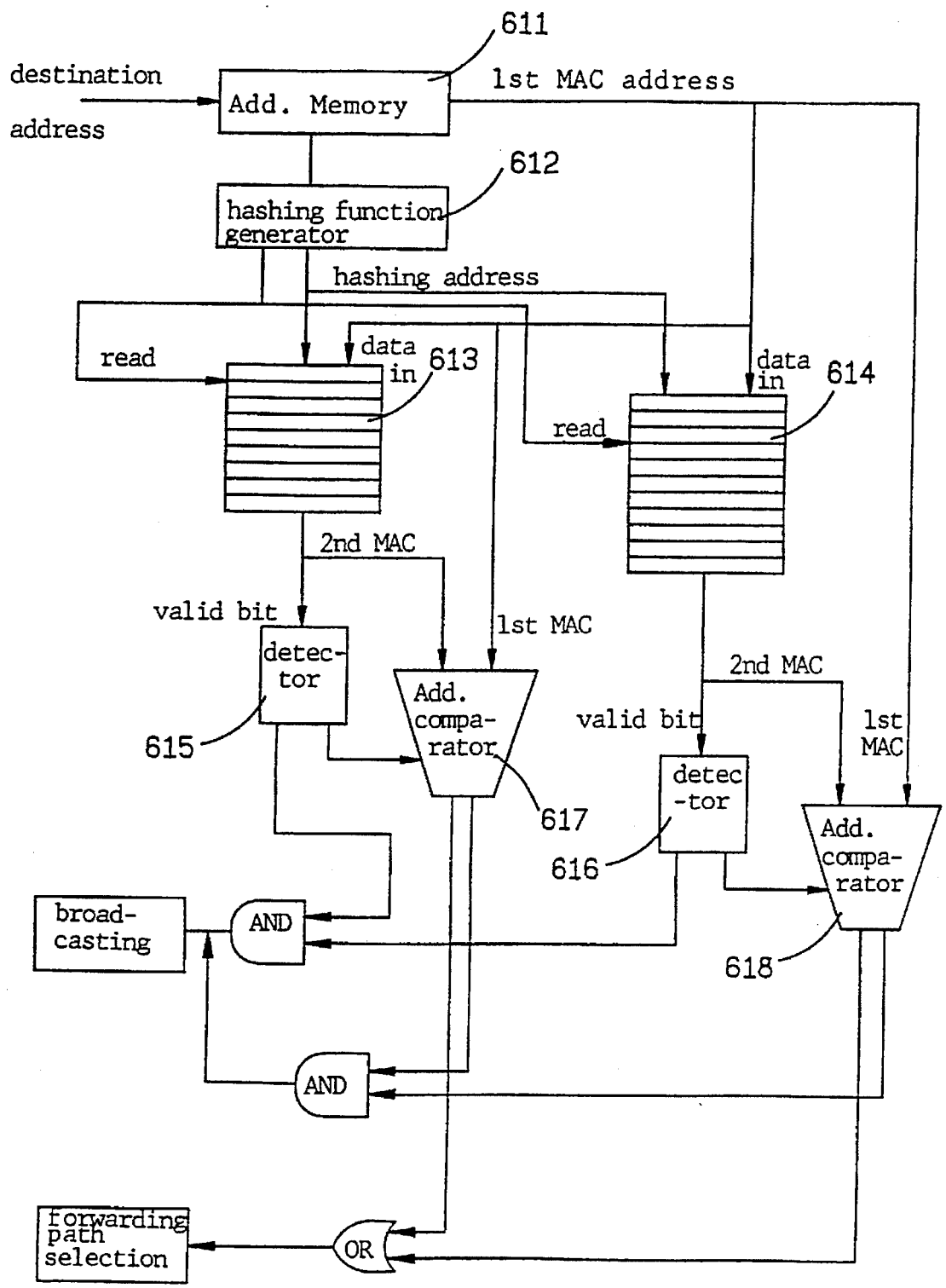
FIG. 6C is a schematic diagram showing a preferred embodiment of a routing procedure processed by a parallel redundancy system according to the present invention.

Referring now to FIG. 6C which is a schematic diagram showing a preferred embodiment of a routing procedure processed by a parallel way according to the present invention, the blocks shown therein represent respectively an address memory 611 for media access control, MAC, a hashing address generator 612, two routing tables 613 and 614 which are memories, two detectors 615 and 616, two address comparators 617 and 618, and an aging comparator 619. The functions of the devices represented by the blocks in FIG. 6C are the same as those in FIG. 6B. FIG. 6C differs from FIG. 6B only in comparing all the second MAC addresses corresponding to the first MAC address and being stored respectively in the routing tables with the first MAC address at the same time rather than sequentially.

In order to compare the efficiency of the integral system and the parallel redundancy system, we simulate the hashing algorithm according to the present invention which is used in Ether exchanger connecting therewith different numbers of Ether Networks, and observe the relationship between the volume of the routing table and the conflict probability. In order to simplify the description, the parallel redundancy system is designed to possess two routing tables which have the same volume. It is assumed that 99% of physical addresses are come from 20 companies, and the rest 1% possibly come from all the rest companies. Furthermore, the hashing address is obtained by an XOR method. From the simulation result, we find that the average conflict probability of this system is much less than that of the integral system having only one routing table whose volume is as large as the total volume of the two routing tables of this system, i.e. the average broadcasting probability of this system is also much less than the integral system. The greater the conflict probability is, the more the times of broadcasting may occur.

Therefore, we can learn that the conflict probability may greatly be reduced by using more than one routing tables under the condition of equal volume of memories. For example, the parallel redundancy system with two routing tables may reduce the conflict probability to 1/10 that of the integral system whose volume is as large as the total volume of the two routing tables In other words, the total volume of the two separate routing tables needed for obtaining a certain conflict probability is about 1/4 that of integral routing table needed for obtaining the same conflict probability. And thus the memory space is economized. The detailed relationships between the volume of the total memory and the required conflict probabilities of the integral system and the parallel redundancy system are listed in Tables 1 & 2 respectively.

TABLE 1 the needed volumes of memories in the integral system under various required conflict probabilities.

| port numbers | required conflict probabilities | | | | |
|---|---|---|---|---|---|
| | ~$10^{-2}$ | ~$10^{-3}$ | ~$10^{-4}$ | ~$10^{-5}$ | ~$10^{-6}$ |
| 100 | 64k | 128k | >512k | >512k | >512k |
| 200 | 64k | 256k | >512k | >512k | >512k |
| 500 | 64k | >512k | >512k | >512k | >512k |
| 800 | 64k | >512k | >512k | >512k | >512k |
| 1000 | 64k | >512k | >512k | >512k | >512k |

Note: the unit of the volumes of memories is "byte".

TABLE 2 the needed volumes of memories in the parallel redundancy system under various required conflict probabilities.

| port numbers | required conflict probabilities | | | | |
|---|---|---|---|---|---|
| | ~$10^{-2}$ | ~$10^{-3}$ | ~$10^{-4}$ | ~$10^{-5}$ | ~$10^{-6}$ |
| 100 | <64k | <64k | 64k | 128k | >512k |
| 200 | <64k | 64k | 128k | 256k | >512k |
| 500 | <64k | 64k | 256k | >512k | >512k |
| 800 | 64k | 128k | 512k | >512k | >512k |
| 1000 | 64k | 128k | 512k | >512k | >512k |

Note: the unit of the volumes of memories is "byte".

Because the 48-bit address is divided into three 16-bit parts in the XOR method, the numbers of the hashing addresses are no more than $2^{16}$, i.e. there are $2^{16}$ or 64 k entries in the routing table. Every entry includes eight bytes, i.e. six for storing physical addresses and two for recording control message, so the largest volume of single routing table is $2^{19}$ or 512k bytes and that of double routing tables is $2^{20}$ or 1024k bytes. When comparing the efficiency of the two systems, we require the total volume of the memories in the two systems be equal, and therefore the total volume we use is no more than 512k bytes. If the total volume larger than 512k bytes has to be used under some required probabilities, we use a symbol >512k but not the real number to express the volume. Likewise, when the smallest volume of memory we use is 64k and the conflict probability is $10^{-n}$, we can obtain a conflict probability greater than $10^{-n}$ by using a memory whose volume is less than 64k. The volume of memory less than 64k is represented by <64K instead of a real number. From Tables 1 & 2, it is found that the parallel redundancy system is indeed better than the integral system for reducing the conflict probability.

Figure 7:
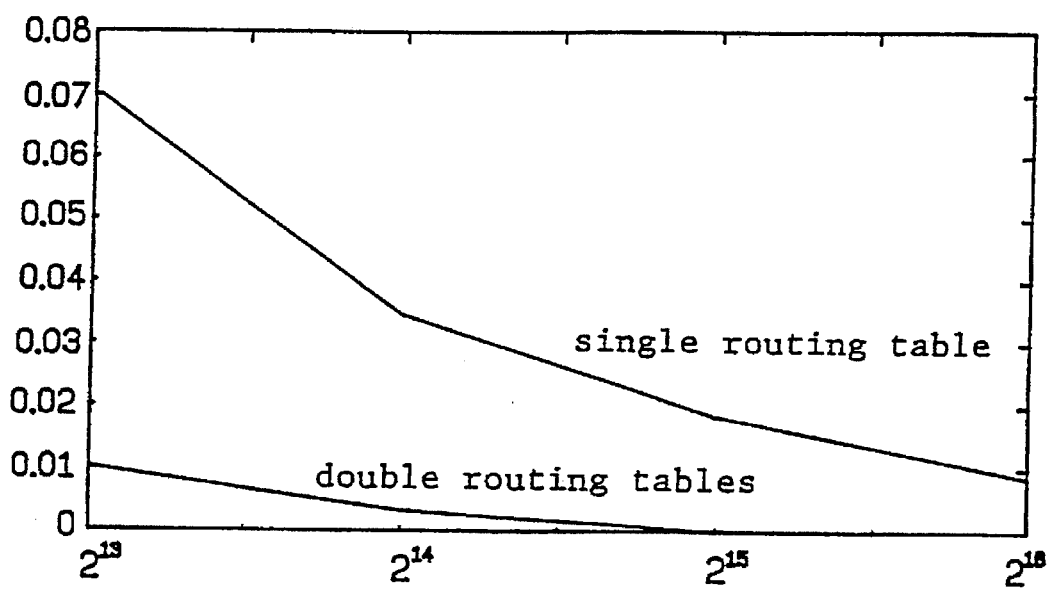
FIG. 7 is a conflict probability vs. memory volume plot of the integral system and the parallel redundancy system.

FIG. 7 is a conflict probability vs. memory volume plot of the integral system and the parallel redundancy system. From FIG. 7, we can obviously find that the present method do reduce the conflict probability greatly.

To sum up, the characteristics of the present invention are that the conflict probability in a learning or a routing procedure can be effectively reduced by using a parallel redundancy system, i.e. using more than one routing table, and the parallel redundancy system can be processed either by a parallel way or by a sequential way.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method adapted to be used in hashing algorithm for reducing conflict probability, comprising the steps of:

receiving a first physical address of a frame;

generating a hashing address corresponding to said first physical address;

comparing a second physical address corresponding to said hashing address with said first physical address to determine if said first and said second physical addresses match with each other;

completing a packet calling process when said first and said second physical addresses match with each other, but going back to said comparing process when said first and said second physical addresses do not match with each other, to determine whether there is another second physical address corresponding to said hashing address and matching with said first physical address;

ending said packet calling process when a number of times that said comparing process is proceeded is greater than a reference value; and the resulting conflict probability is less than a designated value, which is substantially equal to $$\frac{1}{2^n} \times \frac{2^{m-n}}{2^m} \times \frac{2^{m-n}-1}{2^m} \times \ldots \times \frac{2^{m-n}-(N-1)}{2^m},$$

wherein m is the length of said first physical address;

n is the length of said hashing address;

$2^m$ is the total number of said second physical addresses;

$2^n$ is the number of hashing addresses to be held in a routing table; and therefore $1/2^n$ is the probability that a specific address in the routing table is selected;

$2^{m-n}$ is the number of physical addresses that hash to the same address in the routing table; and therefore $$\frac{2^{m-n}}{2^m}$$

is the probability that an address hashes to a selected address in the routing table;

N is the total number of routing tables; and

N−1 is number of a back-up routing table.

2. A method according to claim 1, wherein a definition that said second physical address and said first physical address match with each other is that said second physical address and said first physical address are identical.

3. A method according to claim 1, wherein said packet calling process is a learning procedure.

4. A method according to claim 3, wherein said completing said packet calling process is to complete a learning procedure which records a source address in a routing table to identify from which port said source address comes.

5. A method according to claim 3, wherein said ending packet calling process is to execute a modifying step which substitutes a physical address for another physical address in a routing table.

6. A method according to claim 3, wherein said first physical address is a source address of said frame.

7. A method according to claim 1, wherein said packet calling process is a routing procedure which requests a destination address from a routing table to identify to which port said source address goes.

8. A method according to claim 7, wherein said completing said packet calling process is to complete a routing procedure.

9. A method according to claim 7, wherein ending said packet calling process is to execute a broadcasting step which sends a packet to every port except the source port itself.

10. A method according to claim 7, wherein said first physical address is a destination address of said frame.

11. A method adapted to be used with hashing algorithm for reducing conflict probability, comprising the steps of:

receiving a first physical address of a frame;

generating a hashing address corresponding to said first physical address;

comparing a second physical address corresponding to said hashing address with said first physical address to determine if said first and said second physical addresses match with each other;

completing a packet calling process when said second physical address and said first physical address match with each other, but going back to said generating and comparing processes when said second physical address and said first physical address do not match with each other, to determine whether there is another second physical address corresponding to said hashing address and matching with said first physical address; and ending said packet calling process when a number of times that said generating and comparing processes are proceeded is greater than a reference value; and the resulting conflict probability is less than a designated value, which is substantially equal to $$\frac{1}{2^n} \times \frac{2^{m-n}}{2^m} \times \frac{2^{m-n}-1}{2^m} \times \ldots \times \frac{2^{m-n}-(N-1)}{2^m},$$

wherein m is the length of said first physical address;

n is the length of said hashing address;

$2^m$ is the total number of said second physical addresses;

$2^n$ is the number of hashing addresses to be held in a routing table; and therefore $1/2^n$ is the probability that a specific address in the routing table is selected;

$2^{m-n}$ is the number of physical addresses that hash to the same address in the routing table; and therefore $$\frac{2^{m-n}}{2^m}$$

is the probability that an address hashes to a selected address in the routing table;

N is the total number of routing tables; and

N−1 is number of a back-up routing table.

12. A method according to claim 1, wherein said second physical address is stored in a routing table and said reference value is equal to a number of routing tables.

13. A method according to claim 12, wherein said number of said routing tables is at least two, and the volumes of said at least two routing tables are the same.

14. A method according to claim 12, wherein said number of said routing tables is at least two, the volumes of said at least two routing tables are different, and a number of bits of said hashing address matches with a volume of the routing table having the largest volume.

15. A method according to claim 1, wherein said hashing address is generated by an XOR method.

16. A method according to claim 1, wherein said hashing address is generated by a cyclic redundancy coating (CRC) method.

17. A method according to claim 1, further comprising a step of determining whether said frame is effective after receiving said first physical address of said frame, and executing said comparing step when said frame is effective, but ending said packet calling process when said frame is ineffective.

18. A method according to claim 5, further comprising a step of comparing agings of all of the second physical addresses which have been compared with said first physical address when there is no second physical address matching with said first physical address.

19. A method according to claim 18, wherein said ending packet calling process is to execute said modifying step by substituting said first physical address for the second physical address with the largest aging.

20. A method adapted to be used in a hashing algorithm for reducing conflict probability, comprising the steps of:

receiving a first physical address of a frame;

generating a single hashing address corresponding to said first physical address;

comparing at least two second physical addresses corresponding to said hashing address with said first physical address simultaneously to determine if said first and any of said second physical addresses match with each other;

completing a packet calling process when said first and one of said second physical addresses match with each other;

ending said packet calling process when there is non of said second physical addresses matching with said first physical address; and the resulting conflict probability is less than a designated values, which is substantially equal to $$\frac{1}{2^n} \times \frac{2^{m-n}}{2^m} \times \frac{2^{m-n}-1}{2^m} \times \ldots \times \frac{2^{m-n}-(N-1)}{2^m},$$

wherein m is the length of said first physical address;

n is the length of said hashing address;

$2^m$ is the total number of said second physical addresses;

$2^n$ is the number of hashing addresses to be held in a routing table; and therefore $1/2^n$ is the probability that a specific address in the routing table is selected;

$2^{m-n}$ is the number of physical addresses that hash to the same address in the routing table; and therefore $$\frac{2^{m-n}}{2^m}$$

is the probability that an address hashes to a selected address in the routing table;

N is the total number of routing tables; and

N−1 is number of a back-up routing table.

* * * * *